United States Patent
Mauritz

(10) Patent No.: US 8,599,974 B2
(45) Date of Patent: *Dec. 3, 2013

(54) METHOD AND APPARATUS OF DETERMINING A SET OF ZERO CORRELATION ZONE LENGTHS

(75) Inventor: Oskar Mauritz, Johanneshov (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 982 days.

This patent is subject to a terminal disclaimer.

(21) Appl. No.: 12/605,616

(22) Filed: Oct. 26, 2009

(65) Prior Publication Data

US 2010/0074372 A1    Mar. 25, 2010

Related U.S. Application Data

(63) Continuation of application No. PCT/CN2008/070768, filed on Apr. 22, 2008.

(30) Foreign Application Priority Data

Apr. 30, 2007   (CN) .......................... 2007 1 0074200

(51) Int. Cl.
*H03D 1/00* (2006.01)
*H04L 27/06* (2006.01)

(52) U.S. Cl.
USPC ............ 375/343; 375/132; 375/150; 375/152

(58) Field of Classification Search
USPC ......... 375/260, 262, 314, 259, 347, 343, 150, 375/152, 132
See application file for complete search history.

(56) References Cited

U.S. PATENT DOCUMENTS

| 6,963,600 | B1 | 11/2005 | Fan | |
| 7,720,161 | B1 * | 5/2010 | Dogan et al. | 375/259 |
| 7,738,356 | B2 * | 6/2010 | Kim | 370/208 |
| 7,778,151 | B2 | 8/2010 | Bertrand et al. | |
| 7,792,212 | B2 * | 9/2010 | Lee et al. | 375/295 |

(Continued)

FOREIGN PATENT DOCUMENTS

| CH | 101542953 A | 9/2009 |
| CN | 1297628 A | 5/2001 |

(Continued)

OTHER PUBLICATIONS

"Efficient matched filter for the generalized chirp-like polyphase sequences", by Popovic, B.M; Aerospace and Electronic Systems, IEEE Transactions on; vol. 30, Issue: 3; 1994, pp. 769-777.*

(Continued)

*Primary Examiner* — Qutbuddin Ghulamali

(57) ABSTRACT

A method of determining a set of Zero Correlation Zone (ZCZ) lengths, comprises: determining the length of a root sequence, and selecting such a set of ZCZ lengths that, for any cell radius, the maximum number of preambles obtained from a ZCZ length which is selected from the selected set of ZCZ lengths is closest to the maximum number of preambles determined from a ZCZ length which is selected from the set of all integers, wherein the maximum number of preambles is determined from the length of the root sequence and a ZCZ length selected. This disclosure provides a technical solution for selecting a better limited set of ZCZ lengths by which signaling overload is reduced.

17 Claims, 3 Drawing Sheets

(56) References Cited

U.S. PATENT DOCUMENTS

| | | | |
|---|---|---|---|
| 8,098,745 B2* | 1/2012 | Bertrand et al. | 375/260 |
| 2004/0001529 A1 | 1/2004 | Cai | |
| 2005/0103168 A1 | 5/2005 | Wei | |
| 2008/0235314 A1* | 9/2008 | Lee et al. | 708/426 |
| 2010/0074372 A1 | 3/2010 | Mauritz | |
| 2012/0051292 A1 | 3/2012 | Mauritz | |

FOREIGN PATENT DOCUMENTS

| | | | |
|---|---|---|---|
| CN | 1350379 | A | 5/2002 |
| CN | 1616193 | A | 5/2005 |
| CN | 101299620 | A | 11/2008 |
| JP | 2010519867 | A | 6/2010 |
| JP | 2010525694 | A | 7/2010 |

OTHER PUBLICATIONS

"Generalized chirp-like polyphase sequences with optimum correlation properties"; Popovic, B.M; Information Theory, IEEE Transactions on vol. 38, Issue: 4; 1992, pp. 1406-1409.*

U.S. Office Action dated Feb. 16, 2012, issued in related U.S. Appl. No. 13/291,727, Oskar Mauritz, Huawei Technologies Co., Ltd.

Qingnei, L. et al.; "A Novel Spreading Sequence Set Applied in Quasi-synchronous CDMA System s"; Journal of Telemetry, Tracking, and Command; vol. 27, No. 3; May 2006; (Chinese version 5 pgs.).

English translation of the Written Opinion of the International Searching Authority for International application No. PCT/CN2008/070768, mailed Jul. 31, 2008, 3 pgs.

LG Electronics, Inc., "Design for Restricted Set of Cyclic Shifts", 3GPP TSG RAN WG1 #48bis; R1-071697; St. Julians, Malta, Mar. 26-30, 2007, 3 pgs.

Panasonic, "RACH Sequence Indication Method on BCH", 3GPP TSG RAN WG1 Meeting #48bis; R1-071519; St. Julians, Malta, Mar. 26-30, 2007, 3 pgs.

Huawei, "Specification of Restricted Set of Cyclic Shifts of Root Zadoff-Chu Sequences", TSG RAN WG1 Meeting #48bis; R1-071408; St. Julians, Malta, Mar. 26-30, 2007, 4 pgs.

1st Examination Report issued by IP Australia for application No. 2008247204, dated Jul. 26, 2010, 1 pg.

European Patent Office Communication including, pursuant to Rule 62 EPC, the supplementary European search report (Art. 153 (7) EPC) and the European search opinion for application No. 08734126.9, dated Jul. 6, 2010, 6 pgs.

Qualcomm Europe, "RACH Sequence Structure and Evaluation", 3GPP TSG-RAN WG1; R1-062048; Tallinn, Estonia, Aug. 28-Sep. 1, 2006, 4 pgs.

LGE, "RACH Sequence Design Based on Repetition Method", 3GPP TSG RAN1 LTE WG1 Meeting #46bis; R1-062556; Seoul, Korea, Oct. 9-13, 2006, 8 pgs.

"Outstanding Issues in Random Access Preamble Design for E-UTRA" St. Julian's, Malta, Mar. 26-30, 2007; 3GPP TSG RAN WG1 #48bis; pp. 1-6.

"3rd Generation Partnership Project; Technical Specification Group Radio Access Network; Physical Channels and Modulation (Release 8)"; 3GPP Organizational Partners; 3GPP TS 36.211 v1.0.0 (Mar. 2007); pp. 1-30.

"On Construction and Signaling of RACH Preambles"; Nokia, Siemens, St. Julian's Malta, Mar. 26-30, 2007; 3GPP TSG RAN WG1#48 bis; R1-071661; pp. 1-2.

Office action issued in corresponding Australia application No. 2011201802, dated Apr. 17, 2013, total 2 pages.

Office action issued in corresponding Japanese application No. 2012-026163, dated May 28, 2013, and an English translation thereof, total 4 pages.

TSG RAN WG1 Meeting #49 R1-072325, "Multiple values of cyclic shift increment NCS", Huawei, Kobe, Japan, May 7-11, 2007, total 5 pages.

\* cited by examiner

METHOD AND APPARATUS OF DETERMINING A SET OF ZERO CORRELATION ZONE LENGTHS

CROSS-REFERENCE TO RELATED APPLICATIONS

This application is a continuation of International Patent Application No. PCT/CN2008/070768, filed on Apr. 22, 2008, which claims priority to Chinese Patent Application No. 200710074200.1, filed on Apr. 30, 2007; both of which are incorporated by reference herein in their entireties.

TECHNICAL FIELD

The disclosure relates to the technology of mobile communication, and more particularly, to a method, an apparatus and a mobile communication system of determining a set of Zero Correlation Zone lengths in the Random Access Preamble (RAP) technology.

BACKGROUND

In a mobile communication system, a Random Access Preamble is normally transmitted to a base station by a mobile terminal to initiate the random access procedure and to enable synchronization of the mobile terminal with the base station.

There are 64 preambles in each cell in the document of "3GPP TS 36.211 v1.0.0—Physical Channels and Modulation" which was published in March 2007. When initiating a random access procedure, a mobile terminal transmits one of the 64 preambles. A message is transmitted to a base station by the mobile terminal selecting a particular preamble.

Before transmitting the preamble, a mobile terminal must synchronize to the carrier frequency and the frame timing of a base station to become downlink synchronized. Although the mobile terminal is downlink synchronized, there is uncertainty when a signal transmitted by the mobile terminal arrives at the base station. This is because a mobile terminal far away from the base station will receive downlink signals with a larger delay than a mobile terminal close to the base station, and the transmitted signals in uplink will take longer time to propagate to the base station for a mobile terminal which is far away from the base station compared to the signals from a mobile terminal close to the base station. The uncertainty in round trip time causes interferences between uplink signals transmitted by different mobile terminals unless uplink synchronization is performed before data transmission in uplink.

The transmission of any of the RAPs allows a base station to estimate the time of arrival of an uplink signal. The base station can then, based on the time of arrival estimate transmit a time advance command to a mobile terminal to ensure uplink synchronization. Hence, once a preamble is transmitted by a mobile terminal, the base station may detect which preamble has been transmitted and estimate the time of arrival.

To obtain good detection properties of the preambles, or to accurately estimate the time of arrival of the uplink signal, the set of preambles should be designed to have good autocorrelation and cross-correlation properties.

The set of RAPs in Evolved UTRA (E-UTRA) is defined from one or several root sequences. A subset of the preambles $x_{u,v}(k)$ is generated from the $u^{th}$ order root Zadoff-Chu (ZC) sequence $x_u(k)$ by cyclic shifts of a plurality of the shift increments $N_{CS}$. Specifically, $x_{u,v}(k)$ may be generated according to the equation below:

$$x_{u,v}(k) = x_{u,v}((k+vN_{CS}) \bmod N_{ZC}), \quad (1)$$

where v is an integer, and $N_{ZC}$ is the length of the ZC sequence defined by:

$$x_u(k) = W^{uk(k+1)/2}, k=0, 1, \ldots, N_{ZC}-1, W=e^{-j2\pi/N_{ZC}}, j=\sqrt{-1} \quad (2)$$

The number of preambles that may be generated from a single root sequence is $N_{pre} = \lfloor N_{ZC}/N_{CS} \rfloor$, where $\lfloor n \rfloor$ denotes the largest integer not greater than n. If $N_{pre} < 64$, then several preamble subsets generated from different root sequences are required to obtain 64 preambles in a cell. The cross-correlation between different root sequences is small but still larger than the cross-correlation between sequences generated by a single root sequence. Thus it is beneficial for the detection performance to have $N_{pre} = 64$ if $N_{pre}$ could not be set greater.

The number of ZC sequences contained in each set of ZC sequences with length of $N_{ZC}$ is $N_{ZC}-1$. If the number of root sequences for obtaining the 64 preambles of a cell is $N_r$, $N_r = \lceil 64/N_{pre} \rceil$, where $\lceil n \rceil$ denotes the minimal integer not smaller than n, then the number of disjoint sets is $N_D = \lfloor (N_{ZC}-1)/N_r \rfloor$. Different cells in a network should make use of preambles obtained from disjoint sets of root sequences, so that the base station knows whether a transmitted preamble is intended for a certain cell or not. The larger the number of root sequences $N_r$ that is needed for obtaining 64 preambles in a cell, the smaller is the number of disjoint sets of RAPs $N_D$. Thus, from network planning perspective it is desirable to have $N_{pre} = 64$, and if that is not possible to have as high value as possible of $N_{pre}$.

A subset of preambles generated with equation (1) is a set of so-called Zero-Correlation Zone (ZCZ) sequences. The definition for a set of ZCZ sequences is as follows: a set of M sequences $\{d_v(k)\}$, $v=0, 1, \ldots, M-1$, $k=0, 1, \ldots, N-1$, of length N, is said to be a set of ZCZ sequences, if all the sequences in the set satisfy the following autocorrelation and cross-correlation properties:

The periodic autocorrelation function $\Sigma_{k=0}^{N-1} d_v(k) d_v^*((k+p) \bmod N)$ is zero for all p such that $0 < |p| \leq T$, and the periodic cross-correlation function $\Sigma_{k=0}^{N-1} d_v(k) d_w^*((k+p) \bmod N)$ is zero for all p such that $|p| \leq T$ (including p=0), where T is the length of the ZCZ.

A ZC sequence has ideal periodic autocorrelation, for example, $\Sigma_{k=0}^{N-1} x_u(k) x_u^*((k+p) \bmod N)$ is zero for all non-zero p. Thus the set of preambles defined as cyclic shifts of the root sequence according to equation (1) is a set of ZCZ sequences, where the ZCZ length is $T = N_{CS}-1$.

Based on $N_{pre} = \lfloor N_{ZC}/N_{CS} \rfloor$, $N_{CS}$ should be as small as possible in order to make $N_{pre}$ be as great as possible. But the value of $N_{CS}$ should not be too small. In a base station a bank of correlators are used when receiving RAPs, so that there is one correlator for each preamble. Each correlator outputs time of arrival from 0 to $T \times T_s = (N_{CS}-1) \times T_s$, where $T_s$ is the symbol period of the sequence. The ZCZ property of the set of preambles implies that the correlator for any preamble will give a zero output if any other preamble is transmitted as long as the sum of the round trip time and delay spread in the cell is less than or equal to the product of the length of ZCZ and $T_s$ (i.e., $T \times T_s$). The maximum round trip time $T_r$ in a cell is given by the cell radius R: $T_r = 2R/c$, where c is the speed of light. Thus, the minimum value of the length of ZCZ and the minimum value of $N_{CS}$ length for a certain cell increase with the cell radius. Therefore, the value of the selected $N_{CS}$ should be large enough to ensure that the conditions mentioned above are satisfied.

Since the cell radius to be supported in E-UTRA is from 1 km to 100 km, and since $N_{CS}$ should be as small as possible for any given cell, there is a need for multiple values of $N_{CS}$. The value of an $N_{CS}$ in a cell is broadcast to a mobile terminal by a base station. Of course, the base station may broadcast the length of ZCZ to the mobile terminal, so that the mobile terminal knows how to generate preambles. It is desirable to have as small amount of signaling as possible on the broadcast channel to save overload. Therefore, to achieve low signaling overload, there should be a limited predefined set of values of $N_{CS}$ or a set of lengths of ZCZ.

Currently, it is proposed in the 3GPP Tdoc "R1-071661-On construction and signaling of RACH preambles" disclosed in March 2007 that, the cyclic shift increment value $N_{CS}$ in the cell was proposed to be signalled to the UE but there was no restriction on the values of the cyclic shift increment, which would then give a substantial amount of signalling. An alternative proposal is given in the 3GPP Tdoc "R1-071471—Outstanding issues in random access preamble design for E-UTRA" disclosed in March 2007, which is to have 11 values of $N_{CS}$ without specification how to select the values. Of course, it is not described in these documents how to select the lengths of ZCZ either. Currently there is no feasible scheme for selecting an appropriate limited set of ZCZ lengths, in order to ensure a small and limited signaling overload.

SUMMARY

Embodiments of the disclosure provide a method, an apparatus and a mobile communication system or determining a set of ZCZ lengths, enabling the select of a limited set of ZCZ lengths good for enhancing the quality of random access of mobile terminals and for decreasing the overhead of signaling.

An embodiment of the disclosure provides a method of determining a set of ZCZ lengths, the method comprises: determining a length of a root sequence; selecting such a set of ZCZ lengths that, for any cell radius, the maximum number of preambles determined from a ZCZ length selected from the selected set of ZCZ lengths, the ZCZ length being applicable to the cell and being capable of determining a maximum number of preambles, is closest to the maximum number of preambles determined from a ZCZ length selected from the set of all integers, the ZCZ length being applicable to the cell and being capable of determining a maximum number of preambles, wherein the maximum number of preambles is determined from the length of the root sequence and a ZCZ length selected.

Another embodiment of the disclosure provides an apparatus of determining a set of ZCZ lengths, the apparatus comprises: a length determination unit, adapted to determine the length of a root sequence; and a set selection unit, adapted to select such a set of ZCZ lengths that, for any cell radius, the maximum number of preambles determined from a ZCZ length selected from the selected set of ZCZ length, the ZCZ length being applicable to the cell and being capable of determining a maximum number of preambles, is closest to the maximum number of preambles determined from a ZCZ length selected from the set of all integers, the ZCZ length being applicable to the cell and being capable of determining a maximum number of preambles, wherein the maximum number of preambles is determined from the length of the root sequence and a ZCZ length selected.

Another embodiment of the disclosure provides a base station, which includes: a length determination unit, adapted to determine a length of a root sequence; and a set selection unit, adapted to select such a set of ZCZ lengths that, for any cell radius, the maximum number of preambles determined from a ZCZ length selected from the selected set of ZCZ lengths, the ZCZ length being applicable to the cell and being capable of determining a maximum number of preambles, is closest to the maximum number of preambles determined from a ZCZ length selected from the set of all integers, being applicable to the cell and being capable of determining a maximum number of preambles, wherein the maximum number of preambles is determined from the length of the root sequence and a ZCZ length selected.

Another embodiment of the disclosure provides a mobile communication system, the system comprises a base station and a mobile terminal, the base station is adapted to interact with the mobile terminal, and to specify a ZCZ length from a set of ZCZ lengths for the mobile terminal; the mobile terminal is adapted to generate a preamble according to the ZCZ length specified by the base station, and transmitting an uplink signal to the base station using the preamble; the set of ZCZ lengths is such a set of ZCZ lengths that, for any cell radius, the maximum number of preambles determined from a ZCZ length selected from the selected set of ZCZ lengths, the ZCZ length being applicable to the cell and capable of determining a maximum number of preambles, is closest to the maximum number of preambles determined from a ZCZ length selected from the set of all integers, the ZCZ length being applicable to the cell and capable of determining a maximum number of preambles, wherein the maximum number of preambles is determined from the length of the root sequence and a ZCZ length selected.

In an embodiment of the disclosure, the limited set of ZCZ lengths being selected should satisfy a certain condition, providing a technical solution for selecting a limited set of ZCZ lengths which is relative good with decreased signaling overhead.

DETAILED DESCRIPTION

Figure 1:
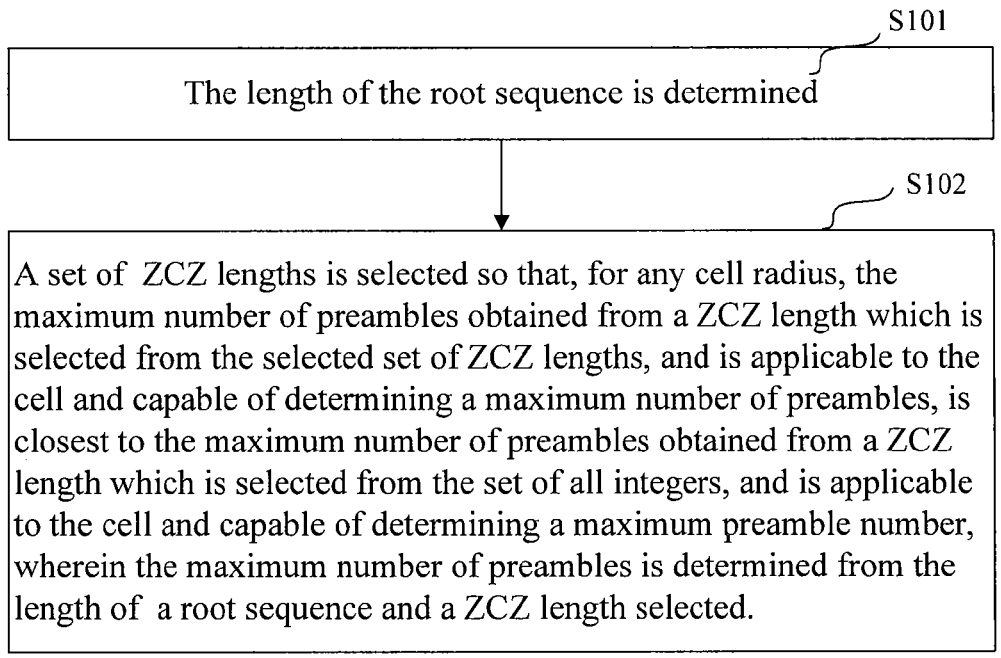
FIG. 1 is a flow chart illustrating an method embodiment of the disclosure.

The general solution of an embodiment of the disclosure is described first, incorporating FIG. 1. As illustrated in FIG. 1, the embodiment includes:

Step 101: The length of the root sequence is determined;

Step 102: A set of ZCZ lengths is selected so that, for any cell radius, the maximum number of preambles determined from a ZCZ length which is selected from the selected set of ZCZ lengths, and is applicable to the cell and capable of determining a maximum number of preambles, is closest to the maximum number of preambles obtained from a ZCZ length which is selected from the set of all integers, and is applicable to the cell and capable of determining a maximum number of preambles, wherein the maximum number of preambles is determined from the length of the root sequence and a ZCZ length selected.

In an embodiment of the disclosure, it should be ensured that the product of a ZCZ length and the symbol period of the sequence is greater than the sum of the round trip time and the delay spread of a cell, i.e., $T \times T_s > T_r + T_d$, in which, T is the length of ZCZ, $T_s$ is the symbol period, $T_r$ is the round trip time, and $T_d$ is the delay spread.

Since the maximum round trip time $T_r$ in a cell is determined by the cell radius R, i.e., $T_r = 2R/c$, where c is the speed of light, $T \times T_s > T_r + T_d$ may be rewritten as $T \times T_s > 2R/c + T_d$.

Furthermore, since $T = N_{CS} - 1$, $T \times T_s > 2R/c + T_d$ may be rewritten as $(N_{CS} - 1) \times T_s > 2R/c + T_d$. Therefore, $N_{CS} > 1 + (2R/c + T_d)/T_s$.

Additionally, since $N_{pre} = \lfloor N_{ZC}/N_{CS} \rfloor$, $N_{pre} < \lfloor N_{ZC}/(1+(2R/c+T_d)/T_s) \rfloor$. Thus, $N_{pre}$ may be a function of the cell radius R. Of course, the cell radius may also be varying; and the value of $N_{pre}$ decreases as the value of $N_{CS}$ increases.

In an embodiment of the disclosure, a limited set of $N_{CS}$ values is constructed, i.e., for a certain cell radius, the $N_{pre}$ corresponding to the minimum $N_{CS}$ value which is selected from the limited set and is applicable to the cell, is closest to the $N_{pre}$ corresponding to the minimum $N_{CS}$ value which is selected from the set of all integers and is applicable to the cell. Furthermore, a maximum relative difference may be constructed from $N_{pre}$. This maximum relative difference is between the $N_{pre}(R)$, which is determined from the minimum $N_{CS}$ value selected from the set of integers and is applicable to the cell, and the $N_{pre}(R)$, which is determined from the minimum $N_{CS}$ value selected from the limited set and is applicable to the cell. If the finally determined or selected limited set is such a set that the maximum relative difference between the $N_{pre}(R)$, which is determined from the minimum $N_{CS}$ value selected from the set of integers and is applicable to the cell, and the $N_{pre}(R)$, which is determined from the minimum $N_{CS}$ value selected from the limited set and is applicable to the cell, is minimized in a cell of any radius, this limited set is a required one.

Figure 2:
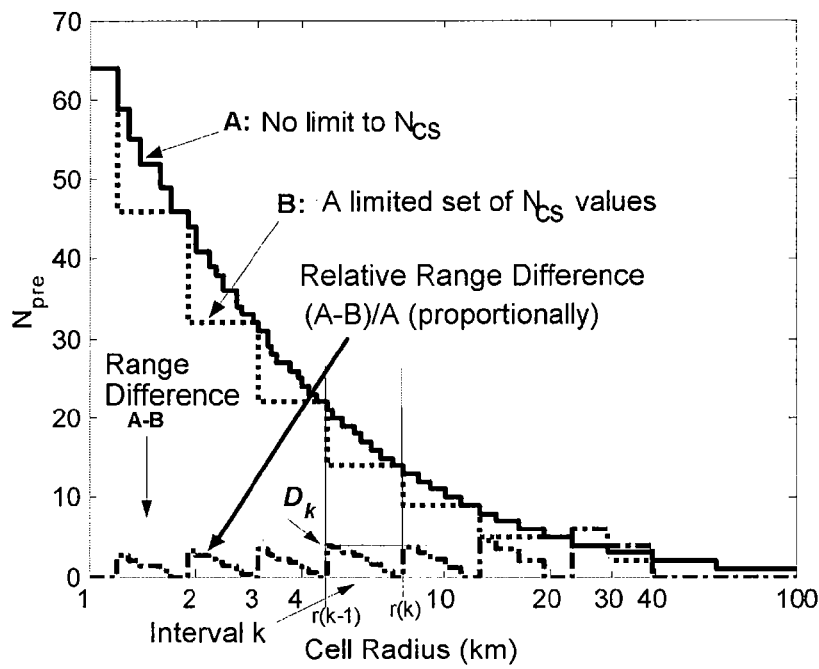
FIG. 2 is a diagram illustrating the relationship between the maximum number of preambles and the cell radius according to an embodiment of the disclosure.

As illustrated in FIG. 2, curve A indicates that for any one cell radius, an integer from the set of all integers may be selected as $N_{CS}$ of the cell, wherein a maximum number of preamble sequences may be generated based on the integer selected, and the generated preamble sequences are applicable to the cell. Curve B indicates a set of $N_{CS}$ including a limited number of $N_{CS}$. When the limited number of $N_{CS}$ is applied in cells of all radii, within a certain interval of cell radii, a same $N_{CS}$ will be used for all cell radii. Thus, the $N_{CS}$ should be determined according to the maximum cell radius in the interval of cell radii. Compared with A, the preamble number generated according to B decreases.

Under these conditions, if the selected limited set ensures that the maximum relative difference between the $N_{pre}(R)$ determined from a $N_{CS}$ value selected from any integer and the $N_{pre}(R)$ determined from a $N_{CS}$ value selected from the limited set is minimized, and it is assumed that the $N_{pre}(R)$ determined from a $N_{CS}$ value selected from any integer is A(R) and the $N_{pre}(R)$ determined from a $N_{CS}$ value selected from the limited set is B(R), and then A(R) and B(R) are respectively illustrated in FIG. 2.

As seen from FIG. 2, there is a small deviation between A(R) and B(R). For a certain cell radius R, the deviation of B(R) from A(R) for some cell radius R may increase the number of required root sequences for that cell radius R. The increase of the number of root sequences becomes very important for large cell radii where $N_{pre}$ is small. For example, if A(R)=3 and B(R)=2, the number of root sequences increases significantly, from $\lceil 64/3 \rceil = 22$ to $\lceil 64/2 \rceil = 32$. An appropriate measure of the deviation of B from A should therefore weigh the difference A-B with higher weight for small $N_{pre}$, e.g. by considering the maximum relative difference between A(R) and B(R), i.e., $[A(R) - B(R)]/A(R)$. We will adopt the maximum relative difference between A(R) and B(R) over all cell radii as the measurement of the deviation of B(R) from A(R), and find a set of $N_{CS}$ values that minimizes this measurement. This set may consist of one $N_{CS} = 0$ and K+1 non-zero $N_{CS}$ values. The total number of $N_{CS}$ values in the set is K+2.

For example, in a relatively small cell, it would be possible to generate 64 ZCZ preambles from a single root sequence if $N_{CS} \lfloor N_{ZC}/64 \rfloor$. This value is the smallest value in the set $N_{CS}(k)$.

The maximum value, $N_{CS}(K)$, is the one that allows for having 2 ZCZ sequences from a set single root sequence, so it is $\lfloor N_{ZC}/2 \rfloor$.

For the largest cells there is only one RAP generated from each root sequence. Therefore, $N_{CS}(K+1) = 0$.

The maximum relative difference between A(R) and B(R), i.e., $[A(R) - B(R)]/A(R)$, is non-increasing with radius R within the interval of $[(r(k-1), r(k)]$ and the interval being k, as illustrated in FIG. 2. In FIG. 2, r(k) denotes the kth radius arranged orderly from small ones to large ones. The reason is that B(R) is constant in the interval, whereas A is inversely proportional to the smallest possible $N_{CS}$ for given R. This value of $N_{CS}$ increases with the round trip time and hence with R.

If it is assumed that the maximum number of preamble sequences of the set A(R) is $N_{pre}(k-1) - 1$ in the cell radius interval of $[(r(k-1), r(k)]$, the maximum number of preamble sequences of the set B(R) generated in this interval associate with the cell radius r(k), i.e., the maximum number of preamble sequences is $N_{pre}(k)$. The maximum relative difference $D_k$ in the interval k may be obtained from the following equation:

$$D_k = \frac{N_{pre}(k-1) - 1 - N_{pre}(k)}{N_{pre}(k-1) - 1}$$

If $D_k$ and $N_{pre}(k-1)$ are given, $N_{pre}(k)$ may be obtained by rearranging the above equation, i.e.:

$$N_{pre}(k) = (1 - D_k)(N_{pre}(k-1) - 1)$$

The maximum relative difference $D_{max}$ for all cell radii may be given by $D_{max} = \max \{D_k\}_{k=1}^{K}$.

For $N_{pre}(k)$, we will first allow $N_{pre}(k)$ to be a real number, and then round the result to the nearest integer. Additionally, $N_{pre}(0)$ and $N_{pre}(K)$ are fixed.

Then $D_{max}$ is minimized if all $D_k$ are equal, i.e. $D_k = D$, k=1, 2, ..., K, as will be proved in the following.

A set of values, $\{N_{pre}^{(1)}(k)\}_{k=0}^{K}$, is constructed with the constraint that $N_{pre}^{(1)}(k) = N_{pre}(k)$ for k=0 and k=K, so that $D_k^{(1)} = D$, k=1, 2, ..., K. For this set, $D_{max} = D$.

Next, another set of values, $\{N_{pre}^{(2)}(k)\}_{k=0}^{K}$, is constructed with the constraint that $N_{pre}^{(2)}(k) = N_{pre}(k)$ for k=0 and k=K, so that $D_{max} < D$, i.e. $D_k^{(2)} < D_k^{(1)}$, k=1, 2, ..., K.

When k=1, since $D_k^{(2)} < D_k^{(1)}$ and $N_{pre}^{(2)}(0) = N_{pre}^{(1)}(0)$, $N_{pre}^{(2)}(1) > N_{pre}^{(1)}(1)$ is obtained according to $N_{pre}(k) = (1 - D_k)(N_{pre}(k-1) - 1)$.

When k=2, since $D_2^{(2)} < D_2^{(1)}$ and $N_{pre}^{(2)}(1) > N_{pre}^{(1)}(1)$, $N_{pre}^{(2)}(2) > N_{pre}^{(1)}(2)$ is obtained according to $N_{pre}(k) = (1 - D_k)(N_{pre}(k-1) - 1)$.

Similarly, for all k, since $N_{pre}^{(2)}(K)=N_{pre}^{(1)}(K)=N_{pre}(K)$, $N_{pre}^{(2)}(k)>N_{pre}^{(1)}(k)$ is impossible.

Thus, it is impossible to construct a set of values $N_{pre}(k)$ such that $D_{max}<D$, which proves that $D_{max}$ is minimized if all $D_k$ are equal, i.e. $D_k=D$, k=1, 2, ..., K.

In this way, the set of values $\{N_{pre}(k)\}_{k=0}^{K}$ which minimizes $D_{max}$ may be found.

Replacing $D_k$ by D in $N_{pre}(k)=(1-D_k)(N_{pre}(k-1)-1)$ and rearranging the equation, a linear difference equation is obtained as follows:

$$N_{pre}(k)-aN_{pre}(k-1)=-a, \text{ wherein } a=(1-D).$$

By recursion, it is obtained from the above equation:

$$N_{pre}(k) = N_{pre}(0)a^k + \frac{a}{1-a}(a^k - 1) \quad (3)$$

From the above equation and the boundary conditions $N_{pre}(0)$ and $N_{pre}(K)$, a may be determined numerically.

For example, the maximum number of preambles generated from one root sequence is 64, i.e., $N_{pre}(0)=64$. The minimum number of preamble obtained by cyclic shift is 2, for example, $N_{pre}(14)=2$. Thus, a=0.856 may be obtained from these two parameters, and all $N_{pre}(k)$, k=1, 2, ... may further be obtained.

The maximum relative difference is minimized through an approximate minimization by a sub-optimal algorithm, i.e., by minimizing the maximum relative difference for fictive real-valued maximum number of ZCZ RAPs, and the maximum number of the ZCZ RAPs is thereafter quantized. The method is specified below.

By first rounding the fictive real-valued $N_{pre}(k)$ in $$N_{pre}(k) = N_{pre}(0)a^k + \frac{a}{1-a}(a^k - 1),$$

the following equation is obtained:

$$N_{CS}(k)=\lfloor N_{ZC}/[N_{pre}(0)\times a^k+a/(1-a)\times(a^k-1)]\rfloor \quad (4)$$

where $\lfloor X \rfloor$ denotes the maximum integer not greater than x, $N_{ZC}$ is the length of the root sequence, $N_{pre}(0)$ denotes the maximum number of preambles generated from the root sequence.

Still taking the above example as an example, if $N_{pre}(0)=64$ and $N_{pre}(14)=2$, a=0.856 is obtained based on equation (3). Next, when $N_{ZC}=839$, $N_{cs}(k)$, k=0, 1, 2, ..., 14 obtained based on equation (4) is illustrated in table 1:

TABLE 1

| k | $N_{CS}(k)$ |
|---|---|
| 0 | 13 |
| 1 | 15 |
| 2 | 18 |
| 3 | 22 |
| 4 | 26 |
| 5 | 32 |
| 6 | 38 |
| 7 | 46 |
| 8 | 59 |
| 9 | 76 |
| 10 | 93 |
| 11 | 119 |
| 12 | 167 |

TABLE 1-continued

| k | $N_{CS}(k)$ |
|---|---|
| 13 | 279 |
| 14 | 419 |

If only one preamble sequence is obtained for a very large cell, which is the sequence itself, then $N_{CS}=0$. Adding this value into the above table, table 2 is obtained:

TABLE 2

| k | $N_{CS}(k)$ |
|---|---|
| 0 | 13 |
| 1 | 15 |
| 2 | 18 |
| 3 | 22 |
| 4 | 26 |
| 5 | 32 |
| 6 | 38 |
| 7 | 46 |
| 8 | 59 |
| 9 | 76 |
| 10 | 93 |
| 11 | 119 |
| 12 | 167 |
| 13 | 279 |
| 14 | 419 |
| 15 | 0 |

Figure 3:
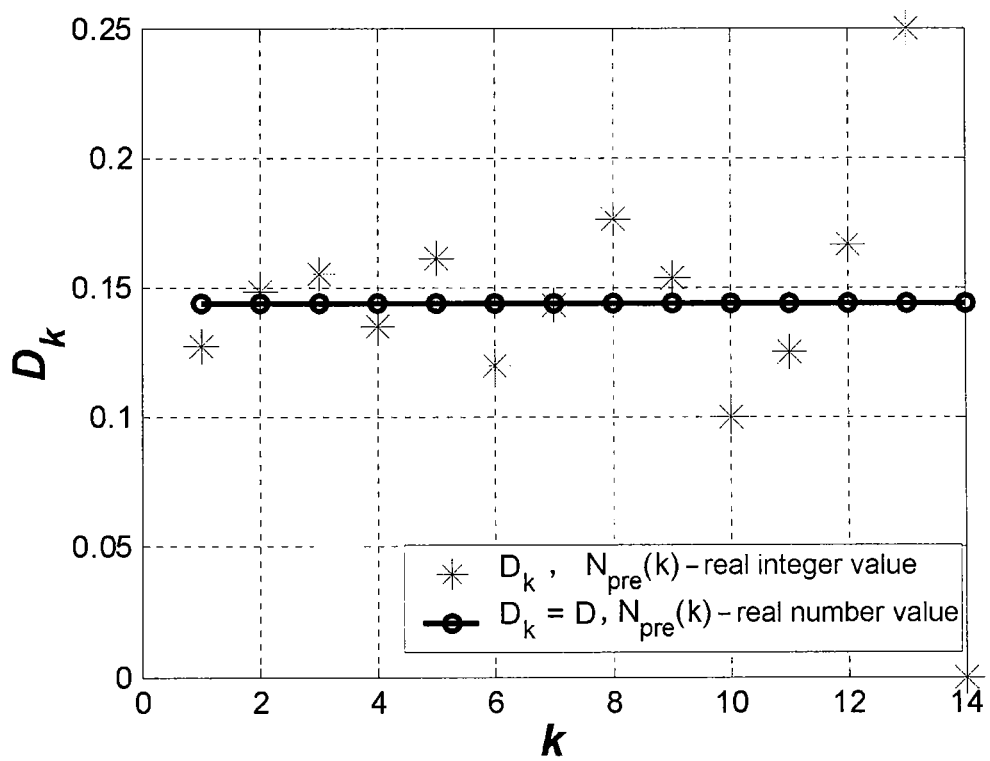
FIG. 3 is a diagram illustrating the value of maximum relative difference in the cell radius interval k according to an embodiment of the disclosure.

Finally, the true integer value of $N_{pre}(k)$ is obtained from $N_{pre}(k)=\lfloor N_{ZC}/N_{CS}(k) \rfloor$ that for some values of k $N_{ZC}/N_{CS}(k)$ are greater than the rounded values $N_{pre}(k)$. As illustrated in FIG. 3, when K=14, the value of $D_k$ obtained from the real number value of $N_{pre}(k)$ is D=0.144. It can be seen from FIG. 3 that the true integer values of $N_{pre}(k)$ will cause $D_k$ to deviate from D. But the deviation is still very small for all cells except the two largest cells. Thus, the selected limited set of values of $N_{CS}$ is applicable.

It should be noted that if the limited set of values of $N_{CS}$ is determined, the limited set of lengths of ZCZ may also be determined, for instance, according to $T=N_{CS}-1$.

Figure 4:
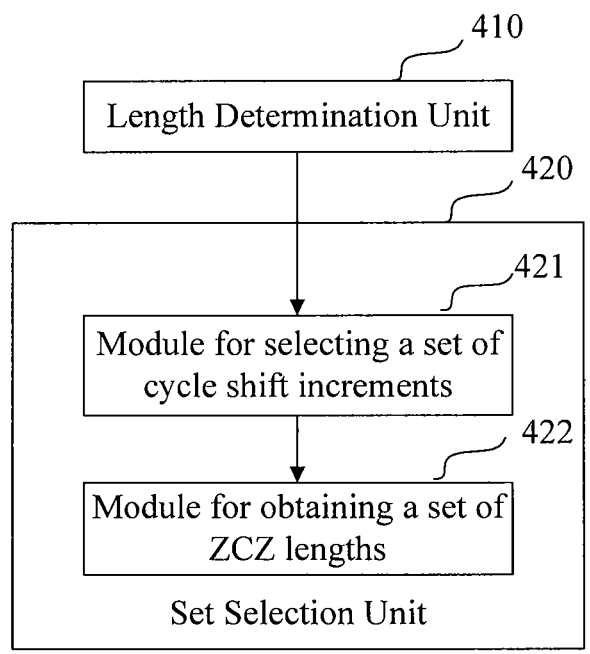
FIG. 4 is a block diagram of the base station according to an embodiment of the disclosure.

Correspondingly, the disclosure provides an embodiment of an apparatus of determining a set of ZCZ lengths. As illustrated in FIG. 4, the apparatus includes: a length determination unit 410, configured to determine a length of a root sequence; and a set selection unit 420, configured to select such a set of ZCZ lengths that, for any cell radius, the maximum number of preambles determined from a ZCZ length which is selected from the selected set of ZCZ lengths, and is applicable to the cell and capable of determining a maximum number of preambles, is closest to the maximum number of preambles determined from a ZCZ length which is selected from the set of all integers, and is applicable to the cell and capable of determining a maximum number of preambles, wherein the maximum number of preambles is determined by the length of the root sequence and a ZCZ length selected.

The set selection unit 420 may include: a module 421 adapted for the selection of a set of cyclic shift increments, wherein, the module 421 is configured to select such a set of cyclic shift increments that, for any cell radius, the maximum number of preambles determined from a cyclic shift increment which is selected from the selected set of cyclic shift increments, and is applicable to the cell, is closest to the maximum number of preambles determined from a cyclic shift increment which is selected from the set of all integers and is applicable to the cell, wherein the maximum number of preambles is determined by the root sequence length and a cyclic shift increment selected; and a module 422 adapted to obtain a set of ZCZ lengths, wherein the module is configured to obtain the set of ZCZ lengths according to the selected set of cyclic shift increments.

In above apparatus embodiment, the cyclic shift increment selected from the selected set of cyclic shift increments is the minimum cyclic shift increment in the selected set of cyclic shift increments; and the cyclic shift increment selected from the set of all integers is the minimum cyclic shift increment in the set of all integers.

The disclosure provides an embodiment of a base station, as illustrated in FIG. 4, which includes: a length determination unit 410, configured to determine a length of a root sequence; and a set selection unit 420, configured to select such a set of ZCZ lengths that, for any cell radius, the maximum number of preambles determined from a ZCZ length which is selected from the selected set of ZCZ lengths, and is applicable to the cell and capable of determining a maximum number of preambles, is closest to the maximum number of preambles determined from a ZCZ length which is selected from the set of all integers, and is applicable to the cell and capable of determining a maximum number of preambles, wherein the maximum number of preambles is determined from the length of the root sequence and a ZCZ length selected.

Figure 5:
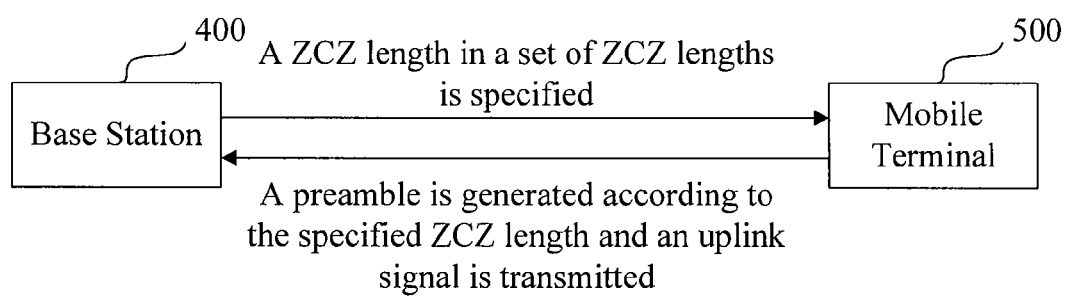
FIG. 5 is a diagram illustrating the mobile communication system according to an embodiment of the disclosure.

The disclosure further provides an embodiment of a mobile communication system, as illustrated in FIG. 5. The system comprises a base station 400 and a mobile terminal 500. The base station 400 is configured to interact with the mobile terminal 500, and to specify a ZCZ length from a set of ZCZ lengths for the mobile terminal 500; the mobile terminal 500 is configured to generate a preamble according to the ZCZ length specified by the base station 400, and to transmit an uplink signal to the base station 400 using the preamble; the set of ZCZ lengths is such a set of ZCZ lengths that, for any cell radius, the maximum number of preambles determined from a ZCZ length which is selected from the selected set of ZCZ lengths, and is applicable to the cell and capable of determining a maximum number of preambles, is closest to the maximum number of preambles determined from a ZCZ length which is selected from the set of all integers, and is applicable to the cell and capable of determining a maximum number of preambles, wherein the maximum number of preambles is determined from the length of the root sequence and a ZCZ length selected.

In above embodiment of the mobile communication system, the cyclic shift increment selected from the selected set of cyclic shift increments is the minimum cyclic shift increment applicable to the cell in the selected set of cyclic shift increments, the cyclic shift increment selected from the set of all integers is the minimum cyclic shift increment applicable to the cell in the set of all integers.

In general, in embodiments of the disclosure, the selected limited set of $N_{CS}$ values should be such a set that, in a plurality of intervals of cell radii, the maximum relative difference between the maximum number of the ZCZ RAPs determined from the minimum $N_{CS}$ value of the limited set, which is applicable to the plurality of cells, and the maximum number of the ZCZ RAPs determined from a plurality of $N_{CS}$ values of a set of integers which are applicable to the plurality of cells is minimized. Furthermore, a limited set of ZCZ lengths may be selected. Of course, in a plurality of intervals of cell radii, the maximum relative difference between the maximum number of the ZCZ RAPs determined from the minimum ZCZ length of the limited set of ZCZ lengths, which is applicable to the plurality of cells, and the maximum number of the ZCZ RAPS determined from a plurality of ZCZ lengths of the set of all integers which are applicable to the plurality of cells is minimized.

What are described above are only preferred embodiments of the disclosure. It should be noted that, for a person skilled in the art, variations and improvements may be made without deviating from the principle of the disclosure. Those variations and improvements are all regarded to be within the scope of the disclosure.

The invention claimed is:

1. A method of determining a set of Zero Correlation Zone, ZCZ, lengths of a mobile communication system, comprising:

selecting, by an appatatus of the mobile communication system, a set of cyclic shift increments $N_{CS}(k)$, the set of cycle shift increments $N_{CS}(k)$ comprising one cyclic shift increments $N_{CS}=0$;

determining by the apparatus, a set of ZCZ lengths by decreasing each non-zero cyclic shift increment of the set of cyclic shift increments $N_{CS}(k)$ by 1, non-zero cyclic shift increments of the set of cyclic shift increments $N_{CS}(k)$ being generated in accordance with the following formula:

$$N_{CS}(k) = \lfloor N_{ZC} / \lceil N_{pre}(0) \times a^k + a/(1-a) \times (a^k - 1) \rceil \rfloor, k=0, 1, 2 \ldots 14;$$

where $a=0.856$, $N_{pre}(0)=64$ and $N_{ZC}=839$.

2. The method according to claim 1, wherein the set of cyclic shift increments being applicable to the plurality of intervals corresponding to cell radii of the communication system, a first cyclic shift increment from the set of cyclic shift increments corresponds to a second cyclic shift increment from a set of all integers, the first cyclic shift increment being applicable to an interval of the plurality of intervals and being capable of determining the first maximum number of preambles for the interval, the second cyclic shift increment being applicable in the interval and being capable of determining a second maximum number of preambles in the interval, the number of elements of the set of cyclic shift increments is less than the number of elements of the set of all integers, the first maximum number of preambles is determined in accordance with the length of a root sequence and the first cyclic shift increment, the first maximum number of preambles is determined in accordance with the length of a root sequence and the second cyclic shift increment, and maximum relative difference between the first maximum number of preambles determined from a first cyclic shift increment and the second maximum number of preambles determined from a second cyclic shift increment is minimized over the plurality of intervals.

3. The method according to claim 2, wherein the maximum relative difference is minimized by performing an approximate minimization by a sub-optimal algorithm.

4. The method according to claim 2, wherein:

the maximum relative difference is minimized for fictive real-valued maximum number of ZCZ Random Access Preambles, ZCZ RAPs, and the fictive real-valued maximum number of the ZCZ RAPs is quantized.

5. The method according to claim 2, wherein the maximum relative difference is minimized in the following way:

the maximum relative difference between the first maximum number of preambles determined from a first cyclic shift increment and the second maximum number of preambles determined from a second cyclic shift increment is the same for all the intervals.

6. The method according to claim 2, wherein the first maximum number of preambles is generated with the following formula:

$$N_{pre}(k) = N_{pre}(0)a^k + \frac{a}{1-a}(a^k - 1),$$
$$k = 1, 2 \ldots, 14:$$

wherein $N_{pre}(0)$ is the maximum number of preambles generated from the root sequence, a=(1−D), and D is the maximum relative difference between the first maximum number of preambles and the second maximum number of preambles.

7. The method according to claim 6, wherein a=0.856 is obtained when $N_{pre}(0)$=64 and $N_{pre}(14)$=2.

8. The method according to claim 2, wherein the maximum number of preambles is obtained for a single root sequence.

9. The method according to claims 2, wherein the root sequence is a Zadoff-Chu sequence.

10. The method of according to claim 2 wherein:
the first cyclic shift increment selected from the set of cyclic shift increments is an applicable minimum cyclic shift increment in the set of cyclic shift increments, and the second cyclic shift increment selected from the set of all integers is an applicable minimum cyclic shift increment in the set of all integers.

11. The method according to claim 2, wherein the product of a ZCZ length in the set of ZCZ lengths and a symbol period is greater than the sum of a round trip time and a delay spread of a cell.

12. A method of determining a set of Zero Correlation Zone, ZCZ, lengths of a mobile communication system, comprising:
selecting, by an apparatus of the mobile communication sysem, a pre-defined set of cyclic shift increments $N_{CS}(k)$;
determining, by the apparatus, a set of ZCZ lengths by decreasing each non-zero cyclic shift increment of the pre-defined set of cyclic shift increments $N_{CS}(k)$ by 1, the pre-defined set of cyclic shift increments $N_{CS}(k)$ including all of the non-zero cyclic shift increments generated by the specific listing of k values provided in the following table:

| k | $N_{CS}(k)$ |
| --- | --- |
| 0 | 13 |
| 1 | 15 |
| 2 | 18 |
| 3 | 22 |
| 4 | 26 |
| 5 | 32 |
| 6 | 38 |
| 7 | 46 |
| 8 | 59 |
| 9 | 76 |
| 10 | 93 |
| 11 | 119 |
| 12 | 167 |
| 13 | 279 |
| 14 | 419. |

13. The method according to claim 12, wherein non-zero cyclic shift increments are generated with the following formula:

$$N_{CS}(k) = \lfloor N_{ZC}/[N_{pre}(0) \times a^k + a/(1-a) \times (a^k - 1)] \rfloor, k=0, 1, 2 \ldots, 14;$$

where a=0.856, $N_{pre}(0)$=64 and, $N_{ZC}$=839.

14. An apparatus for determining a set of Zero Correlation Zone, ZCZ, lengths of a mobile communication system, comprising:
a unit, adapted to select a set of cyclic shift increments $N_{CS}(k)$; and
a unit, adapted to determine a set of ZCZ lengths by decreasing each non-zero cyclic shift increment of predefined set of cyclic shift increments by $N_{CS}(K)$ 1, the predefined set of cyclic shift increments $N_{CS}(K)$ including all of the non-zero cyclic shift increments generated by the specific listing of k values provided in the following table:

| k | $N_{CS}(k)$ |
| --- | --- |
| 0 | 13 |
| 1 | 15 |
| 2 | 18 |
| 3 | 22 |
| 4 | 26 |
| 5 | 32 |
| 6 | 38 |
| 7 | 46 |
| 8 | 59 |
| 9 | 76 |
| 10 | 93 |
| 11 | 119 |
| 12 | 167 |
| 13 | 279 |
| 14 | 419. |

15. A mobile communication system, comprising a base station, wherein the base station comprises:
an apparatus configured to determine a set of Zero Correlation Zone, ZCZ, lengths by decreasing each nonzero cyclic shift increment of a pre-defined set of cyclic shift increments $N_{CS}(k)$ by 1, the pre-defined set of cyclic shift increments $N_{CS}(k)$ being used for generating random access preambles, and the pre-defined set of cyclic shift increments $N_{CS}(k)$ including all of the non-zero cyclic shift increments generated by the listing of k values provided in the following table:

| k | $N_{CS}(k)$ |
| --- | --- |
| 0 | 13 |
| 1 | 15 |
| 2 | 18 |
| 3 | 22 |
| 4 | 26 |
| 5 | 32 |
| 6 | 38 |
| 7 | 46 |
| 8 | 59 |
| 9 | 76 |
| 10 | 93 |
| 11 | 119 |
| 12 | 167 |
| 13 | 279 |
| 14 | 419 | and a unit, adapted to specify a ZCZ length from the set of ZCZ lengths for a mobile terminal.

16. A communication system, comprising a base station in communication with a mobile terminal, wherein the base station is arranged to receive from the mobile terminal a signal comprising a random access preamble with a Zero Correlation Zone length from a set of ZCZ lengths, the set of ZCZ lengths being determined by decreasing each non-zero cyclic shift increment of a pre-defined set of cyclic shift increments $N_{CS}(k)$ by 1, and the pre-defined set of cyclic shift increments $N_{CS}(k)$ including all of the non-zero cyclic shift increments generated by the specific listing of k values provided in the following table:

| k | $N_{CS}(k)$ |
|---|---|
| 0 | 13 |
| 1 | 15 |
| 2 | 18 |
| 3 | 22 |
| 4 | 26 |
| 5 | 32 |
| 6 | 38 |
| 7 | 46 |
| 8 | 59 |
| 9 | 76 |
| 10 | 93 |
| 11 | 119 |
| 12 | 167 |
| 13 | 279 |
| 14 | 419. |

17. A communication system, comprising a mobile terminal in communication with a base station, wherein the mobile terminal is arranged to transmit to the base station a signal comprising a random access preamble with a Zero Correlation Zone length from a set of ZCZ lengths, the set of ZCZ lengths being determined by decreasing each non-zero cyclic shift increment of a pre-defined set of cyclic shift increments $N_{CS}(k)$ by 1, and the pre-defined set of cyclic shift increments $N_{CS}(k)$ including all of the non-zero cyclic shift increments generated by the specific listing of k values provided in the following table:

| k | $N_{CS}(k)$ |
|---|---|
| 0 | 13 |
| 1 | 15 |
| 2 | 18 |
| 3 | 22 |
| 4 | 26 |
| 5 | 32 |
| 6 | 38 |
| 7 | 46 |
| 8 | 59 |
| 9 | 76 |
| 10 | 93 |
| 11 | 119 |
| 12 | 167 |
| 13 | 279 |
| 14 | 419. |

* * * * *